United States Patent
Zhang (10) Patent No.: US 11,784,469 B2
(45) Date of Patent: Oct. 10, 2023

(54) CONNECTOR FOR COMBINING CABINETS AND POWER DISTRIBUTION CABINET ASSEMBLY

(71) Applicant: SUNGROW POWER SUPPLY CO., LTD., Anhui (CN)

(72) Inventor: Hao Zhang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 17/391,878

(22) Filed: Aug. 2, 2021

(65) Prior Publication Data

US 2022/0131347 A1 Apr. 28, 2022

(30) Foreign Application Priority Data

Oct. 27, 2020 (CN) .......................... 202022443086.9

(51) Int. Cl.
*H02G 3/04* (2006.01)
*H02G 3/22* (2006.01)
*H02B 1/30* (2006.01)

(52) U.S. Cl.
CPC ............... *H02B 1/305* (2013.01); *H02G 3/04* (2013.01); *H02G 3/22* (2013.01)

(58) Field of Classification Search
CPC ............. H02B 1/305; H02G 3/04; H02G 3/22
USPC ........................................................ 361/622
See application file for complete search history.

(56) References Cited

U.S. PATENT DOCUMENTS

| 3,404,706 A | * | 10/1968 | D Esopo | ............... | H02G 3/0431 |
| | | | | | 174/101 |
| 4,349,220 A | * | 9/1982 | Carroll | ................. | H02G 3/0608 |
| | | | | | 138/155 |
| 2006/0246774 A1 | * | 11/2006 | Buck | .................... | H01R 9/0521 |
| | | | | | 439/578 |

(Continued)

FOREIGN PATENT DOCUMENTS

| DE | 102008056620 B3 | 3/2010 |
| GB | 2557947 A | 7/2018 |
| JP | 2000059930 A | 2/2000 |

OTHER PUBLICATIONS

Extended European Search Report regarding Application No. 21186210.7 dated Jan. 5, 2022.

*Primary Examiner* — Timothy J Thompson
*Assistant Examiner* — Michael F McAllister
(74) *Attorney, Agent, or Firm* — Harness, Dickey & Pierce, P.L.C.

(57) ABSTRACT

A connector for combining cabinets includes a flexible connector which is deformable and is configured to communicate inner cavities of a first cabinet machine and a second cabinet machine. The flexible connector includes a hollow cavity for an electrical connector to pass through, and the hollow cavity forms a first open end and a second open end at two ends of the flexible connector. The first open end is sealingly connected to a side plate of the first cabinet machine, the second open end is sealingly connected to a side plate of the second cabinet machine, and the first cabinet machine and the second cabinet machine are two adjacent cabinet machines. The structure of the connector for combining cabinets is simple and the mounting is convenient, and the flexible connector can automatically adapt to the mounting position through its own deformation so as to meet the normal mounting requirements.

11 Claims, 4 Drawing Sheets

(56) References Cited

U.S. PATENT DOCUMENTS

| | | | |
|---|---|---|---|
| 2012/0019111 A1* | 1/2012 | Buescher | H02B 1/308 |
| | | | 312/109 |
| 2014/0157512 A1* | 6/2014 | Yanity | A61H 33/0087 |
| | | | 4/541.3 |
| 2015/0047276 A1* | 2/2015 | Gandolfo | F16L 5/04 |
| | | | 52/220.8 |
| 2016/0090259 A1* | 3/2016 | Koda | B65H 31/22 |
| | | | 414/787 |
| 2017/0354836 A1* | 12/2017 | Lopes | A62C 2/065 |
| 2019/0219170 A1* | 7/2019 | Gandolfo | F16J 15/022 |

* cited by examiner

ND POWER DISTRIBUTION CABINET ASSEMBLY

CONNECTOR FOR COMBINING CABINETS AND POWER DISTRIBUTION CABINET ASSEMBLY

CROSS REFERENCE TO RELATED APPLICATIONS

This application claims the priorities to Chinese patent application No. 202022443086.9, titled "CONNECTOR FOR COMBINING CABINETS AND POWER DISTRIBUTION CABINET ASSEMBLY", filed with the China National Intellectual Property Administration on Oct. 27, 2020, the entire disclosure of which is hereby incorporated by reference.

FIELD

The present application relates to the technical field of power expansion for power distribution cabinets, and in particular to a connector for combining cabinets and a power distribution cabinet assembly.

BACKGROUND

According to the different functions, a variety of different electrical equipment need to be mounted in a power distribution cabinet. In a case of the power distribution cabinet in a photovoltaic power station, in order to convert direct current generated by the photovoltaic power station into alternating current that may be utilized by an electrical appliance or the same as a power grid, a converter is required in the power distribution cabinet.

In recent years, the photovoltaic power station has been widely used, and electrical energy generated by the photovoltaic power station has also been greatly increased. Therefore, the market has an increasing demand for a high-power converter, and improving the power level of the converter has become a technical direction that those skilled in the art focus on.

In addition to redesigning high-power products, multiple low-power converters combined in parallel may also be utilized to improve the power level of the converter. When the cabinets are combined in parallel, communication cables, copper bars and other components generally pass through between the cabinet machine (that is, the power distribution cabinet) and the cabinet. A higher outdoor protection level is required after the cabinets are combined, which puts forward higher requirements for the design of a connector for combining cabinets.

At present, the connector for combining cabinets existing in the market may have the problems of complex structure and complicated mounting, or the problem that the mounting cannot be realized due to the deviation of the mounting position between two adjacent cabinet machines.

SUMMARY

In view of this, one object according to the present application is to provide a connector for combining cabinets, so as to simplify the structure and adjust the deviation of the mounting position between two adjacent cabinet machines.

Another object according to the present application is to provide a power distribution cabinet assembly with the above connector for combining cabinets.

In order to achieve the above objects, the present application provides the following technical solutions:

a connector for combining cabinets includes a flexible connector which is deformable and is configured to communicate inner cavities of a first cabinet machine and a second cabinet machine. The flexible connector includes a hollow cavity for an electrical connector to pass through, and the hollow cavity forms a first open end and a second open end at two ends of the flexible connector. The first open end is sealingly connected to a side plate of the first cabinet machine, the second open end is sealingly connected to a side plate of the second cabinet machine, and the first cabinet machine and the second cabinet machine are two adjacent cabinet machines Preferably, the side plate of the first cabinet machine includes a first embedding groove recessed toward the inner cavity of the first cabinet machine, and the side plate of the second cabinet machine includes a second embedding groove recessed toward the inner cavity of the second cabinet machine. The first open end of the flexible connector is configured to be embedded in the first embedding groove and fixedly connected with the first embedding groove, and the second open end of the flexible connector is configured to be embedded in the second embedding groove and fixedly connected with the second embedding groove.

Preferably, the connector for combining cabinets further includes a first pressing ring which matches an inner cavity of the first open end. The first pressing ring is embedded in the inner cavity of the first open end, and the first pressing ring and the flexible connector are mounted in the first embedding groove through a first fastening screw.

Preferably, the connector for combining cabinets further includes a second pressing ring which matches an inner cavity of the second open end. The second pressing ring is embedded in the inner cavity of the second open end, and the second pressing ring and the flexible connector are mounted in the second embedding groove through a second fastening screw.

Preferably, the first open end is provided with a first floating mounting plate, a central portion of the first floating mounting plate is provided with a first mounting sleeve arranged outside the first open end, and the first pressing ring, the flexible connector and the first floating mounting plate are fixedly connected through a third fastening screw, an edge of the first floating mounting plate is provided with a first flange which abuts against a bottom edge of the first embedding groove, and the first flange is mounted in the first embedding groove through the first fastening screw; and/or the second open end is provided with a second floating mounting plate, a central portion of the second floating mounting plate is provided with a second mounting sleeve arranged outside the second open end, and the second pressing ring, the flexible connector and the second floating mounting plate are fixedly connected through a fourth fastening screw, an edge of the second floating mounting plate is provided with a second flange which abuts against a bottom edge of the second embedding groove, and the second flange is mounted in the second embedding groove through the second fastening screw.

Preferably, the connector for combining cabinets further includes a first mounting plate and a second mounting plate. The first mounting plate is configured to sealingly mount on the side plate of the first cabinet machine, and a first protruding opening capable of extending into the inner cavity of the first cabinet machine is provided on the first mounting plate, and the first protruding opening constitutes the first embedding groove. The second mounting plate is configured to sealingly mount on the side plate of the second cabinet machine, and a second protruding opening capable of extending into the inner cavity of the second cabinet machine is provided on the second mounting plate, and the second protruding opening constitutes the second embedding groove.

Preferably, a sealing strip is provided between the first mounting plate and the side plate of the first cabinet machine and between the second mounting plate and the side plate of the second cabinet machine.

Preferably, both the first open end and the second open end are rectangular.

Preferably, a cross-sectional area of the first open end is unequal to a cross-sectional area of the second open end, and the flexible connector is in a shape of a quadrangular frustum pyramid.

Preferably, a cross-sectional area of the first open end is equal to a cross-sectional area of the second open end, and the flexible connector is in a shape of a cuboid.

Preferably, the flexible connector is a silicone rubber connector or a silicon-titanium canvas connector.

A power distribution cabinet assembly provided according to the present application, includes at least a first cabinet machine and a second cabinet machine adjacent to each other, the first cabinet machine and the second cabinet machine are electrically connected through a connector for combining cabinets, and the connector for combining cabinets is the connector for combining cabinets according to any one of the above.

The connector for combining cabinets provided according to the present application includes the flexible connector, and the inner cavities of the first cabinet machine and the second cabinet machine are communicated through the flexible connector. The flexible connector includes the hollow cavity for the electrical connector to pass through, and the hollow cavity forms the first open end and the second open end at two ends of the flexible connector. The first open end is sealingly connected to the side plate of the first cabinet machine, the second open end is sealingly connected to the side plate of the second cabinet machine, so as to achieve the required sealing protection level, and since the flexible connector itself has the property of being deformable, the flexible connector can meet the normal mounting requirements through its own deformation when the mounting position between the two adjacent cabinet machines has a deviation.

It can be seen that, the connector for combining cabinets provided according to the present application has a simple structure, only the first open end and the second open end of the flexible connector need to be sealingly connected to the first cabinet machine and the second cabinet machine respectively, and the mounting is convenient and fast. In addition, since the flexible connector itself is deformable, so that the flexible connector is able to automatically adapt to the mounting position through its own deformation so as to meet the normal mounting requirements.

The above connector for combining cabinets is utilized by the power distribution cabinet assembly provided according to the present application, so that the power distribution cabinet assembly also has the corresponding technical advantages of the above connector for combining cabinets, which will not be repeated herein.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

| Reference numerals are as follows: | |
|---|---|
| 1 | first mounting plate, |
| 2 | first fastening screw, |
| 3 | first pressing ring, |
| 4 | first open end, |
| 5 | flexible connector, |
| 6 | second open end, |
| 7 | fourth fastening screw, |
| 8 | second pressing ring, |
| 9 | second flange, |
| 10 | second mounting plate, |
| 11 | second embedding groove, |
| 12 | second floating mounting plate, |
| 13 | second mounting sleeve, |
| 14 | first embedding groove, |
| 15 | second fastening screw, |
| 16 | first flange, |
| 17 | first mounting sleeve, |
| 18 | third fastening screw. |

DETAILED DESCRIPTION OF THE EMBODIMENTS

One core according to the present application is to provide a connector for combining cabinets, so as to simplify the structure and adjust the deviation of the mounting position between two adjacent cabinet machines.

Another core according to the present application is to provide a power distribution cabinet assembly with the above connector for combining cabinets.

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other obtained without creative efforts by those of the ordinary skill in the art shall fall within the protection scope of the present application.

The connector for combining cabinets provided according to the present application, includes a flexible connector 5 which is deformable and is configured to communicate inner cavities of a first cabinet machine and a second cabinet machine, and the flexible connector 5 includes a hollow cavity, electrical connectors realize the electrical connection between electrical components in the first cabinet machine and the second cabinet machine after passing through the hollow cavity. It should be understood that the electrical connectors should include but are not limited to a copper bar and a communication cable. It can be understood with reference to FIG. 1 that the hollow cavity forms a first open end 4 and a second open end 6 at two ends of the flexible connector 5, the first open end 4 is sealingly connected to a side plate of the first cabinet machine, and the second open end 6 is sealingly connected to a side plate of the second cabinet machine. It should be noted that the first cabinet machine and the second cabinet machine in this embodiment are two adjacent cabinet machines (that is, an electrical cabinet including the power distribution cabinet).

Figure 1:
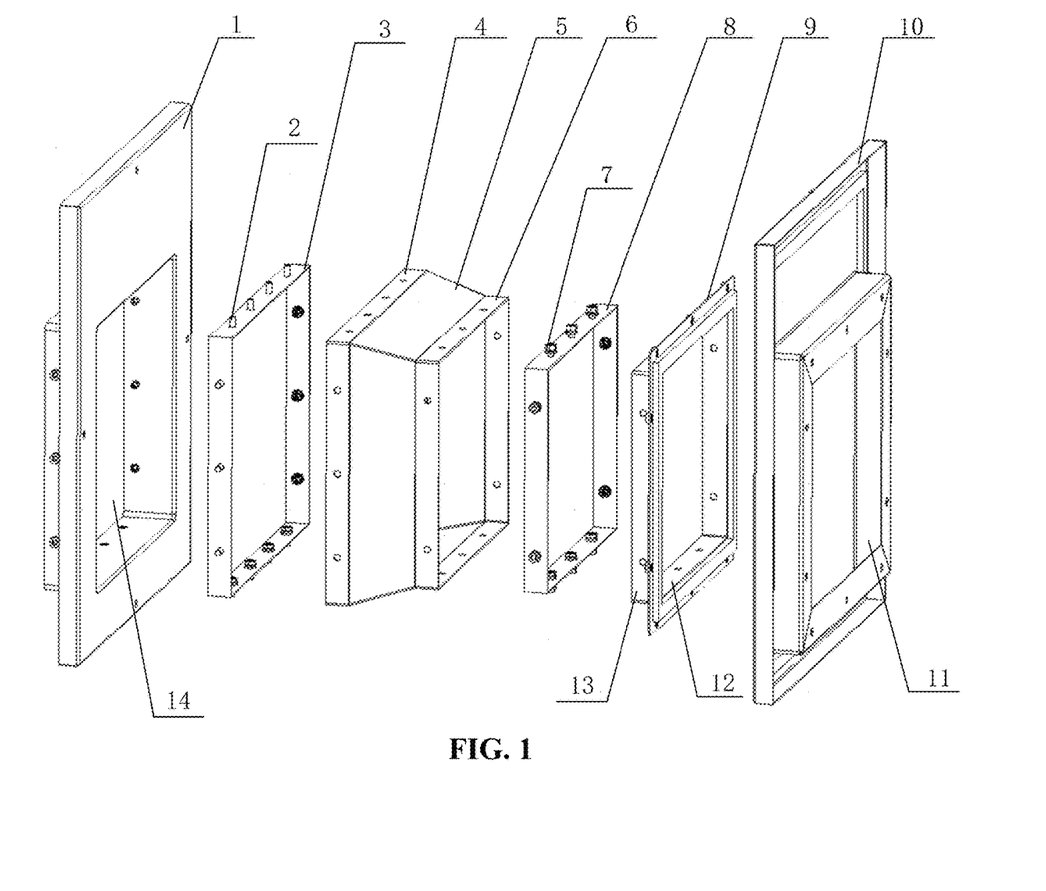
FIG. 1 is a schematic diagram of the exploded structure of a connector for combining cabinets provided according to an embodiment of the present application.

The connector for combining cabinets provided according to the present application has a simple structure, only the first open end 4 and the second open end 6 of the flexible connector need to be sealingly connected to the first cabinet machine and the second cabinet machine respectively, and the mounting is convenient and fast. In actual design, a cross section of the hollow cavity should at least allow the passage of copper bar with a relatively large volume, or even allow the passage of the copper bar and the communication cable at the same time. Since the flexible connector 5 itself is deformable, so that the flexible connector 5 can automatically adapt to the mounting position through its own deformation even if the mounting position of the two adjacent cabinet machines has a deviation due to uneven foundation or other reasons, which meets the normal mounting requirements between the two ends of the flexible connector 5 and the two adjacent cabinet machines.

In order to conveniently realize a sealed connection between the two ends of the flexible connector 5 and the first cabinet machine and the second cabinet machine, in the solution provided in this embodiment, the side plate of the first cabinet machine includes a first embedding groove 14 recessed toward the inner cavity of the first cabinet machine, the side plate of the second cabinet machine includes a second embedding groove 11 recessed toward the inner cavity of the second cabinet machine, the first open end 4 of the flexible connector 5 is configured to be embedded in the first embedding groove 14 and fixedly connected with the first embedding groove 14, and the second open end 6 of the flexible connector 5 is configured to be embedded in the second embedding groove 11 and fixedly connected with the second embedding groove 11. Since the flexible connector 5 is deformable itself, the first open end 4 can realize the sealing of the contact position with the first embedding groove 14 when the first open end 4 is fixedly connected in the first embedding groove 14, and the second open end 6 can realize the sealing of the contact position with the second embedding groove 11 when the second open end 6 is fixedly connected in the second embedding groove 11. Moreover, in order to further improve the sealing effect, sealing components may be added between the first open end 4 and the first embedding groove 14 and between the second open end 6 and the second embedding groove 11.

The "fixedly connected" between the first open end 4 and the first embedding groove 14 includes but is not limited to be connected by stuck or be fixedly connected through a connector. In a possible implementation, the connector for combining cabinets further includes a first pressing ring 3 which matches an inner cavity of the first open end 4. The first pressing ring 3 is embedded in the inner cavity of the first open end 4, and the first pressing ring 3 and the flexible connector 5 are mounted in the first embedding groove 14 through a first fastening screw 2.

The "fixedly connected" between the second open end 6 and the second embedding groove 11 includes but is not limited to be connected by clamping or be fixedly connected through a connector. In a possible embodiment, the connector for combining cabinets further includes a second pressing ring 8 which matches an inner cavity of the second open end 6. The second pressing ring 8 is embedded in the inner cavity of the second open end 6, and the second pressing ring 8 and the flexible connector 5 are mounted in the second embedding groove 11 through a second fastening screw 15.

It should be noted that, the first embedding groove 14 and the second embedding groove 11 may be directly arranged on the side plates of the first cabinet machine and the second cabinet machine, or mounting openings may be defined on the side plates of the first cabinet machine and the second cabinet machine, and the first embedding groove 14 and the second embedding groove 11 are formed by adding other components at the mounting openings.

Referring to FIG. 1, the connector for combining cabinets provided in this embodiment further includes a first mounting plate 1 and a second mounting plate 10. The first mounting plate 1 is configured to sealingly mount on the side plate of the first cabinet machine, and a first protruding opening capable of extending into the inner cavity of the first cabinet machine is provided on the first mounting plate 1, and the first protruding opening constitutes the first embedding groove 14. The second mounting plate 10 is configured to sealingly mount on the side plate of the second cabinet machine, and a second protruding opening capable of extending into the inner cavity of the second cabinet machine is provided on the second mounting plate 10, and the second protruding opening constitutes the second embedding groove 11. In order to ensure the sealing between the first mounting plate 1 and the side plate of the first cabinet machine, a sealing strip may be added between the first mounting plate 1 and the side plate of the first cabinet machine. Similarly, in order to ensure the sealing between the second mounting plate 10 and the side plate of the second cabinet machine, a sealing strip may be added between the second mounting plate 10 and the side plate of the second cabinet machine.

Figure 3:
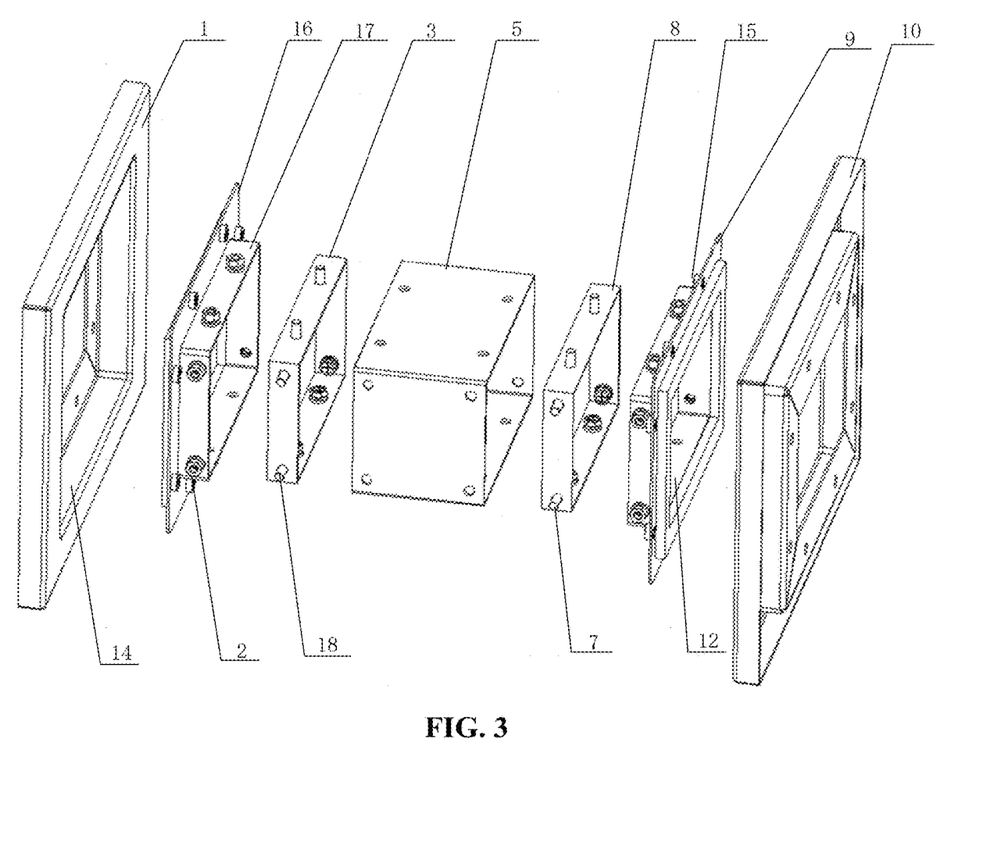
FIG. 3 is a schematic diagram of the exploded structure of the connector for combining cabinets provided according to another embodiment of the present application.
Figure 4:
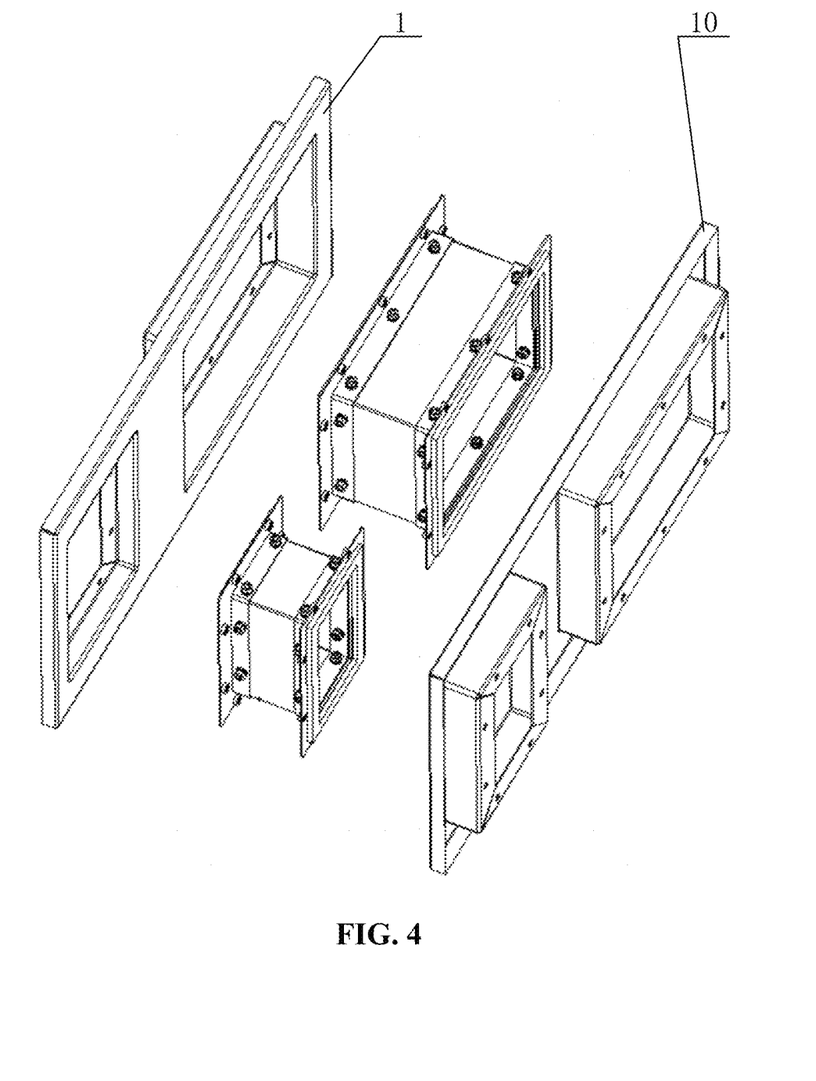
FIG. 4 is a schematic mounting diagram of the connector for combining cabinets in FIG. 3.

In the actual mounting of the combining cabinets, a distance between two adjacent cabinet machines ranges from 10 mm to 20 mm. The mounting is relatively difficult in such a narrow space after the two ends of the flexible connector 5 are respectively embedded in the first embedding groove 14 and the second embedding groove 11. Therefore, it is necessary to further optimize the design of the connector for combining cabinets. In the connector for combining cabinets in this embodiment, the first open end 4 is provided with a first floating mounting plate, a central portion of the first floating mounting plate is provided with a first mounting sleeve 17 arranged outside the first open end 4. The first pressing ring 3, the flexible connector 5 and the first floating mounting plate are fixedly connected through a third fastening screw 18. An edge of the first floating mounting plate is provided with a first flange 16 which abuts against a bottom edge of the first embedding groove 14, and the first flange 16 is mounted in the first embedding groove 14 through the first fastening screws 2. Apparently, the first pressing ring 3 and the flexible connector 5 in this embodiment are indirectly mounted in the first embedding groove 14 by means of the first floating mounting plate and the first fastening screw 2.

Before the mounting of the combining cabinets, the second mounting plate 10, the second pressing ring 8, the flexible connector 5, the first pressing ring 3 and the first floating mounting plate should be combined as a whole. Specifically, the second pressing ring 8 is embedded in the inner cavity of the second open end 6, and then the second open end 6 is embedded in the second embedding groove 11, and then the second pressing ring 8 and the second open end 6 of the flexible connector 5 are mounted in the second embedding groove 11 through the second fastening screw 15. The first pressing ring 3 is embedded in the inner cavity of the first open end 4, the first mounting sleeve 17 on the first floating mounting plate is arranged outside the first open end 4, and the first pressing ring 3, the first open end 4 of the flexible connector 5 and the first floating mounting plate are connected as whole.

When the combining cabinets are mounted, first the second mounting plate 10 is sealingly mounted on the side plate of the second cabinet machine. If necessary, a sealing strip may be arranged on the second mounting plate 10 and the side plate of the second cabinet machine, so as to improve the protection level. Then the first mounting plate 1 is fixed on the side plate of the first cabinet machine in advance. After the first cabinet machine and the second cabinet machine are fixed, the deformation of the flexible connector 5 is adapted to adjust the first flange 16 to abut against the bottom edge of the first embedding groove 14. An installer can fasten the first flange 16 in the first embedding groove 14 through the first fastening screw 2 inside the first cabinet machine, and the mounting of the combining-cabinet connector is completed at this time. The arrangement of the first floating mounting plate allows the installer to fasten the first fastening screw 2 from the interior of the first cabinet machine, which effectively solves the mounting difficulty caused by too small distance between the two adjacent cabinet machines.

It can be understood by those skilled in the art that in addition to the technical solution of arranging the first floating mounting plate at the first open end, the following solution can also be used to achieve the same objects.

Figure 2:
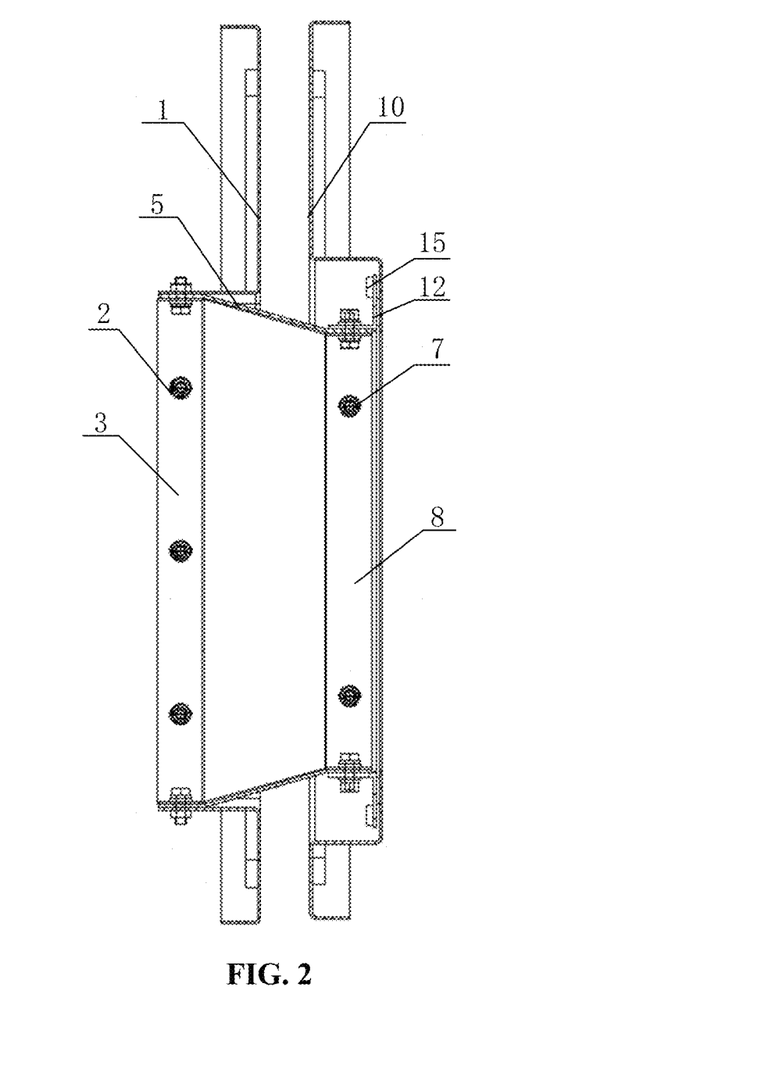
FIG. 2 is a schematic sectional top view of the connector for combining cabinets in FIG. 1.

As shown in FIGS. 1 and 2, the first open end 4 is not provided with the first floating mounting plate, only a first pressing ring 3 is provided, and the first pressing ring 3 and the first open end 4 of the flexible connector 5 are mounted in the first embedding groove 14 through the first fastening screw 2. A second floating mounting plate 12 is provided at the second open end 6, the second pressing ring 8 is embedded in the inner cavity of the second open end 6, a second mounting sleeve 13 of the second floating mounting plate 12 is arranged outside the second open end 6, and the second pressing ring 8, the second open end 6 of the flexible connector 5 and the second floating mounting plate 12 are connected as a whole through a fourth fastening screw 7.

When the combining cabinets are mounted, first the first mounting plate 1 is sealingly mounted on the side plate of the first cabinet machine. If necessary, a sealing strip may be arranged on the first mounting plate 1 and the side plate of the first cabinet machine, so as to improve the protection level. Then the second mounting plate 10 is fixed on the side plate of the second cabinet machine in advance. After the first cabinet machine and the second cabinet machine are fixed, the deformation of the flexible connector 5 is adapted to adjust the second flange 9 to fit with the bottom edge of the second embedding groove 11. An installer can fasten the second flange 9 in the second embedding groove 11 through the second fastening screw 15 inside the second cabinet machine, and the mounting of the combining-cabinet connector is completed at this time. The arrangement of the second floating mounting plate 12 also allows the installer to fasten the second fastening screw 15 from the interior of the first cabinet machine, which effectively solves the mounting difficulty caused by too small distance between the two adjacent cabinet machines.

It is not difficult to understand that the first floating mounting plate and the second floating mounting plate 12 may be respectively arranged at the first open end 4 and the second open end 6 of the flexible connector 5, as shown in FIGS. 3 and 4.

Before the mounting of the combining cabinets, the first floating mounting plate, the first pressing ring 3, the flexible connector 5, the second pressing ring 8, and the second floating mounting plate 12 are combined as a whole, specifically:

the first pressing ring 3 is embedded in the inner cavity of the first open end 4, the first mounting sleeve 17 of the first floating mounting plate is arranged outside the first open end 4, and the first pressing ring 3, the first open end 4 of the flexible connector 5 and the first floating mounting plate are connected as a whole through the third fastening screw 18. The second pressing ring 8 is embedded in the inner cavity of the second open end 6, the second mounting sleeve 13 of the second floating mounting plate 12 is arranged outside the second open end 6, and the second pressing ring 8, the second open end 6 of the flexible connector 5 and the second floating mounting plate 12 are connected as a whole through the fourth fastening screw 7.

When the combining cabinets are mounted, the first mounting plate 1 and the second mounting plate 10 are respectively fastened on the side of the first cabinet machine and the side of the second cabinet machine. Considering the enhanced protection level, a sealing strip may be added between the first mounting plate 1 and the side of the first cabinet machine and between the second mounting plate 10 and the side of the second cabinet machine. Then the installer may, according to the convenience of the actual operating environment, fix the first flange 16 in the first embedding groove 14 from the interior or outside of the first cabinet machine through the first fastening screw 2, and fix the second flange 9 in the second embedding groove 11 from the interior or outside of the second cabinet machine through the second fastening screw 15.

The first mounting plate 1 and the second mounting plate 10 may be sealingly fixed to the side plates of the first cabinet machine and the second cabinet machine respectively by welding, or may be detachably secured to the side plates of the first cabinet machine and the second cabinet machine by using a fastener such as a screw.

The specific shape of the flexible connector 5 is not limited, and the sectional shape of the flexible connector 5 may be rectangular, triangular, quadrilateral or circular, etc., and considering the convenience of production and mounting, the sectional shape of the flexible connector 5 in this embodiment is rectangular.

In an embodiment, both the first open end 4 and the second open end 6 of the flexible connector 5 are rectangular, and a cross-sectional area of the first open end 4 is not equal to a cross-sectional area of the second open end 6, the whole flexible connector 5 is in a shape of a quadrangular frustum pyramid, and a slope structure is formed between the first open end 4 and the second open end 6, as shown in FIGS. 1 and 2.

In another embodiment, both the first open end 4 and the second open end 6 of the flexible connector 5 are rectangular, a cross-sectional area of the first open end 4 is equal to a cross-sectional area of the second open end 6, and the whole flexible connector 5 is in a shape of a cuboid (including a cube), as shown in FIGS. 3 and 4.

The manufacturing material of the flexible connector 5 is not limited to one, and the material which may be used includes at least silicone rubber and silicon-titanium canvas. Other materials that meet the requirements of variability, waterproof and ultraviolet aging resistance may also be used to manufacture the flexible connector 5, which is not specifically limited in this application.

A power distribution cabinet assembly provided according to the embodiments of the present application, includes at least a first cabinet machine and a second cabinet machine adjacent to each other. The first cabinet machine and the second cabinet machine are electrically connected through a connector for combining cabinets, and the connector for combining cabinets is the connector for combining cabinets according to any one of the above embodiments.

It should be noted that, according to actual mounting requirements, one or more connectors may be used to combine the two adjacent cabinet machines. In the solution shown in FIG. 4, two connectors are used to combine the two adjacent cabinet machines.

Since the connector for combining cabinets in the above embodiments is utilized, the power distribution cabinet assembly has the corresponding technical advantages of the above connector for combining cabinets. Those skilled in the art can understand with reference to the description of the above embodiments, which will not be repeated herein.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A connector for combining cabinets, comprising a flexible connector which is deformable and is configured to communicate inner cavities of a first electrical cabinet and a second electrical cabinet, wherein the flexible connector comprises a hollow cavity for an electrical connector to pass through, and the hollow cavity forms a first open end and a second open end at two ends of the flexible connector, the first open end is sealingly connected to a side plate of the first electrical cabinet, the second open end is sealingly connected to a side plate of the second electrical cabinet, and the first electrical cabinet and the second electrical cabinet are two adjacent cabinet electrical cabinets;
wherein the side plate of the first electrical cabinet comprises a first embedding groove recessed toward the inner cavity of the first electrical cabinet, the side plate of the second electrical cabinet comprises a second embedding groove recessed toward the inner cavity of the second electrical cabinet, the first open end of the flexible connector is configured to be embedded in the first embedding groove and fixedly connected with the first embedding groove, and the second open end of the flexible connector is configured to be embedded in the second embedding groove and fixedly connected with the second embedding groove.

2. The connector for combining cabinets according to claim 1, further comprising a first pressing ring which matches an inner cavity of the first open end, wherein the first pressing ring is embedded in the inner cavity of the first open end, and the first pressing ring and the flexible connector are mounted in the first embedding groove through a first fastening screw.

3. The connector for combining cabinets according to claim 2, further comprising a second pressing ring which matches an inner cavity of the second open end, wherein the second pressing ring is embedded in the inner cavity of the second open end, and the second pressing ring and the flexible connector are mounted in the second embedding groove through a second fastening screw.

4. The connector for combining cabinets according to claim 3, wherein the first open end is provided with a first floating mounting plate, a central portion of the first floating mounting plate is provided with a first mounting sleeve arranged outside the first open end, and the first pressing ring, the flexible connector and the first floating mounting plate are fixedly connected through a third fastening screw, an edge of the first floating mounting plate is provided with a first flange which abuts against a bottom edge of the first embedding groove, and the first flange is mounted in the first embedding groove through the first fastening screw; and/or
the second open end is provided with a second floating mounting plate, a central portion of the second floating mounting plate is provided with a second mounting sleeve arranged outside the second open end, the second pressing ring, the flexible connector and the second floating mounting plate are fixedly connected through a fourth fastening screw, an edge of the second floating mounting plate is provided with a second flange which abuts against a bottom edge of the second embedding groove, and the second flange is mounted in the second embedding groove through the second fastening screw.

5. The connector for combining cabinets according to claim 1, further comprising a first mounting plate and a second mounting plate, wherein the first mounting plate is configured to sealingly mount on the side plate of the first electrical cabinet, and a first protruding opening extendable into the inner cavity of the first electrical cabinet is provided on the first mounting plate, and the first protruding opening constitutes the first embedding groove;
the second mounting plate is configured to sealingly mount on the side plate of the second electrical cabinet, and a second protruding opening extendable into the inner cavity of the second electrical cabinet is provided on the second mounting plate, and the second protruding opening constitutes the second embedding groove.

6. The connector for combining cabinets according to claim 5, wherein a sealing strip is provided between the first mounting plate and the side plate of the first electrical cabinet, and between the second mounting plate and the side plate of the second electrical cabinet.

7. The connector for combining cabinets according to claim 1, wherein both the first open end and the second open end are rectangular.

8. The connector for combining cabinets according to claim 7, wherein a cross-sectional area of the first open end is unequal to a cross-sectional area of the second open end, and the flexible connector is in a shape of a quadrangular frustum pyramid.

9. The connector for combining cabinets according to claim 7, wherein a cross-sectional area of the first open end is equal to a cross-sectional area of the second open end, and the flexible connector is in a shape of a cuboid.

10. The connector for combining cabinets according to claim 1, wherein the flexible connector is a silicone rubber connector or a silicon-titanium canvas connector.

11. A power distribution cabinet assembly, comprising at least a first electrical cabinet and a second electrical cabinet adjacent to each other, wherein the first electrical cabinet and the second electrical cabinet are electrically connected through the connector for combining cabinets according to claim 1.

\* \* \* \* \*